US009108608B2

(12) United States Patent
Cutright et al.

(10) Patent No.: US 9,108,608 B2
(45) Date of Patent: Aug. 18, 2015

(54) METHOD FOR ADJUSTING BRAKING PARAMETERS OF A TRAIN TO ACCOUNT FOR TRAIN CHARACTERISTIC PARAMETER VARIATIONS

(75) Inventors: Eric Dale Cutright, Charlottesville, VA (US); Chinnarao Mokkapati, Export, PA (US); Robert Dennis Pascoe, Pittsburgh, PA (US)

(73) Assignee: Ansaldo STS USA, Inc., Pittsburgh, PA (US)

( * ) Notice: Subject to any disclaimer, the term of this patent is extended or adjusted under 35 U.S.C. 154(b) by 20 days.

(21) Appl. No.: 13/237,060

(22) Filed: Sep. 20, 2011

(65) Prior Publication Data

US 2012/0072088 A1 Mar. 22, 2012

Related U.S. Application Data

(60) Provisional application No. 61/384,890, filed on Sep. 21, 2010.

(51) Int. Cl.
*B60T 13/66* (2006.01)
*B60T 17/22* (2006.01)

(52) U.S. Cl.
CPC ............. *B60T 13/665* (2013.01); *B60T 17/228* (2013.01)

(58) Field of Classification Search
CPC .............................. B60T 13/665; B60T 17/228
USPC ......................................................... 701/70
IPC ............................................. B60T 8/34, 8/172
See application file for complete search history.

(56) References Cited

U.S. PATENT DOCUMENTS

| 4,041,283 | A | 8/1977 | Mosier |
| 5,828,979 | A | 10/1998 | Polivka et al. |
| 6,154,735 | A | 11/2000 | Crone |
| 6,415,230 | B1 | 7/2002 | Maruko et al. |
| 6,587,764 | B2 | 7/2003 | Nickles et al. |

(Continued)

OTHER PUBLICATIONS

Presciani et al., "Development of a braking model for a speed supervision system", World Congress on Railway Research, Nov. 2001, pp. 1-18.*

(Continued)

*Primary Examiner* — John R Olszewski
*Assistant Examiner* — Todd Melton
(74) *Attorney, Agent, or Firm* — Eckert Seamans Cherin & Mellott, LLC; Philip E. Levy

(57) ABSTRACT

A method of adjusting one or more of braking parameters used in a braking function to control braking of a train includes determining an adjustment factor based on a joint stopping distance probability distribution, the joint stopping distance probability distribution representing the composite effect on stopping distance of a plurality of predetermined train characteristic parameters, each of the predetermined train characteristic parameters being variable, and applying the adjustment factor to each of the one or more of braking parameters. Also, a method of adjusting braking parameters that includes determining an adjustment factor based on a nominal value, a worst case limit value and a best case limit value of each of a plurality of predetermined train characteristic parameters, each of the predetermined train characteristic parameters being variable, and applying the adjustment factor to each of the one or more of braking parameters.

18 Claims, 11 Drawing Sheets

(56) References Cited

U.S. PATENT DOCUMENTS

| | | | |
|---|---|---|---|
| 6,760,712 | B1 | 7/2004 | Bonissone et al. |
| 7,188,013 | B2 | 3/2007 | Krimmel et al. |
| 7,715,961 | B1 | 5/2010 | Kargupta |
| 2007/0208482 | A1 | 9/2007 | Thiede et al. |
| 2008/0051969 | A1 | 2/2008 | Demaya et al. |
| 2008/0281477 | A1 | 11/2008 | Hawthorne et al. |
| 2008/0306641 | A1* | 12/2008 | Matusiak et al. ............... 701/19 |
| 2010/0262321 | A1 | 10/2010 | Daum et al. |

OTHER PUBLICATIONS

Malvezzi et al., "Probabilistic analysis of braking performance in railways", Proceedings of the Institution of Mechanical Engineers Part F, vol. 217 Iss. 3, May 2003, pp. 149-165.*

Brosseau et al., "Development of an adaptive predictive braking enforcement algorithm", Federal Railroad Administration Office of Research and Development, Jun. 2009, pp. 11-30.*

* cited by examiner

| PARAMETER | BC VALUE | NOMINAL VALUE | WC VALUE | BC Δ IN BD (ft) | NOMINAL Δ IN BD (ft) | WC Δ IN BD (ft) | DISTRIBUTION MIXED FREIGHT (MFT) |
|---|---|---|---|---|---|---|---|
| VEHICLE BRAKE FORCE/BRAKE SHOE 90-PSI BCP | 13% | 10% | 8.5% | -608.9 | 0 | 428.5 | ID 5: α=11 β=6 MODE: 10% BRAKE FORCE/SHOE −857+x·1285 |
| VEHICLE BRAKE CYLINDER PISTON STROKE | 6.0" | 7.5" | 9.0" | -574.3 | 0 | 580.3 | ID 6: α=10 β=10 MODE: 7.5" BRAKE CYLINDER PISTON STROKE −580.3+x·1161 |

FIG. 4C

| PARAMETER | BC VALUE | NOMINAL VALUE | WC VALUE | BC Δ IN BD (ft) | NOMINAL (ft) | WC Δ IN BD (ft) | DISTRIBUTION MIXED FREIGHT (MFT) |
|---|---|---|---|---|---|---|---|
| LOCOMOTIVE WEIGHT | −5% | ACTUAL | +5% | −11.2 | 0 | 11.3 | ID 15: α=10, β=10 MODE: ACTUAL LOC WEIGHT; −11.3+x·22.6; range −15 to 15; −5%, −4%, −2%, 0, +2%, +4%, +5% |
| VEHICLE LENGTH | −5% | ACTUAL | +5% | 0.0 | 0 | 0.0 | |
| AMBIENT PRESSURE | 14.0 PSI | 14.7 PSI | 14.7 PSI | −3.6 | 0 | 0.0 | |
| BRAKE PIPE LEAKAGE | 5 PSIG/MIN | 0.1 PSIG/MIN | 0.1 PSIG/MIN | −124.4 | 0 | 0.0 | |

FIG. 4G

METHOD FOR ADJUSTING BRAKING PARAMETERS OF A TRAIN TO ACCOUNT FOR TRAIN CHARACTERISTIC PARAMETER VARIATIONS

CROSS-REFERENCE TO RELATED APPLICATIONS

This application claims priority under 35 U.S.C. §119(e) from U.S. Provisional Application No. 61/384,890, entitled "Method for Adjusting Braking Parameter Expressions to Account for Consist Parameter Variations", filed on Sep. 21, 2010, the disclosure of which is incorporated herein by reference.

GOVERNMENT CONTRACT

Inventors' Assignee has a contract with the Alaska Railroad Corporation, an Alaskan corporation (ARRC Contract No. 25329). Funding for this contract is provided, in part, by the Federal Railroad Administration, a United States government agency. The United States government may have certain rights in the invention described herein.

BACKGROUND OF THE INVENTION

1. Field of the Invention

The present invention relates to the automatic control of trains, and in particular to positive train control systems and methodologies that provide enhanced safety by controlling the braking of a train including generating braking signals or requests that are provided to a train engineer and/or that automatically cause a brake application to occur.

2. Description of the Related Art

Positive train control (PTC) refers to various technologies that are used to monitor and control the movements of trains, such as passenger and freight trains, to provide increased safety. In PTC systems, the train receives information about its location, including maximum speed limits and where it is allowed to safely travel. Equipment on-board the train then enforces these limits to prevent unsafe movement. In one aspect, PTC systems employ sophisticated braking algorithms designed to review speeds, track conditions, and vehicle locations and automatically slow a train or bring a train to a safe stop (by alerting the crew and/or automatically causing an emergency stop of the train) if the train encounters a condition that could lead to an accident (such as the engineer not paying attention to a signal or a switch not being fully engaged). A typical PTC system consists of equipment provided on the train, equipment provided in a centralized control center, equipment provided on the rail wayside, and a wireless communication system that allows for wireless communications between the elements just identified.

U.S. patent application Ser. No. 12/703,959, entitled "System and Method for Controlling Braking of a Train" and assigned to the assignee of the present invention (hereinafter "the '959 application"), the disclosure of which is incorporated herein by reference, describes an algorithm for controlling the braking of a train that is based on three particular braking parameters that are unique to a train and its particular train consist. Those three parameters are propagation delay time (Td), brake build-up time (T), and maximum brake rate ($\alpha_{max}$). Brake propagation delay time (Td) as used herein is the time duration between a brake application request by the on-board computer of the train and the time that the braking effort begins, brake build-up time (T) as used herein is the time duration between braking effort initiation and the achievement of the full braking effort, and maximum brake rate ($\alpha_{max}$) as used herein is the constant brake rate achieved during steady-state braking. In one embodiment, the '959 application provides a method of controlling the braking of a train that is implemented in a train-borne component of a positive train control system that includes the on-board computer of the train. The method, as implemented, includes obtaining in the on-board computer a brake propagation delay time ($T_d$), a brake build-up time (T), and a maximum brake rate ($\alpha_{max}$) for the train, and controlling the braking of the train in the on-board computer by generating one or more braking profiles for the train using the $T_d$, T and $\alpha_{max}$ values, which braking profiles may then be displayed to the driver of the train for controlling the train. The '959 application also, in another embodiment, provides a method of determining the above described three braking parameters based on certain known train consist parameters for the train, including the length (L) of the train consist, the ratio (w) of the weight (W) of the train consist to the total number (V) of brake valves in the train consist excluding any brake valves on any locomotives in the train consist, the total number (N) of cars in the train consist excluding any locomotives, and the number ($n_i$) of each type of car in the train consist excluding any locomotives. In this embodiment, brake propagation delay time ($T_d$) for the train is based on L, N and $n_i$, brake build-up time (T) for the train is based on L, N and $n_i$, and maximum brake rate ($\alpha_{max}$) for the train is based on L, N, $n_i$ and w.

While the above described methodologies have proven to be effective, there is still room for improvement in connection therewith. In particular, the braking performance of a train obtained by using the above described three braking parameters computed from the known consist parameters does not account for random variations in certain train characteristics such as, without limitation, presence of empty/load sensors, percent operable brakes, types of brake valves, brake cylinder piston stroke length, brake pipe length and pressure, and braking force per shoe, among others. The braking performance also does not account for factors such as location of locomotives in the consist and use of distributed power, changes in the weight of the locomotives, errors in individual car counts and loads, differences in actual track grade versus grade data stored in the on-board computer, error in measured train speed, and changes in ambient temperature and pressure. It would thus be advantageous to be able to effectively adjust the brake propagation delay time ($T_d$), brake build-up time (T) and maximum brake rate ($\alpha_{max}$) braking parameters to account for random variation in various train consist parameters and other factors listed above, among others, in order to ensure safe braking performance of the train while also improving it operational efficiency.

SUMMARY OF THE INVENTION

In one embodiment, a method of adjusting one or more of braking parameters used in a braking function to control braking of a train is provided. The method includes determining an adjustment factor based on a joint stopping distance probability distribution, the joint stopping distance probability distribution representing the composite effect on stopping distance of a plurality of predetermined train characteristic parameters, each of the predetermined train characteristic parameters being variable, and applying the adjustment factor to each of the one or more of braking parameters.

In another embodiment, a method of adjusting one or more of braking parameters used in a braking function to control braking of a train is provided that includes determining an adjustment factor based on a nominal value, a worst case limit value and a best case limit value of each of a plurality of predetermined train characteristic parameters, each of the predetermined train characteristic parameters being variable, and applying the adjustment factor to each of the one or more of braking parameters.

Another embodiment provides a train-borne component of a positive train control system comprising an on-board computer for a train, the on-board computer being programmed to control braking of the train using one or more of braking parameters by implementing the methods just described.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 4A-4G provide a table that shows the nominal, best case and worst case values for certain train characteristic parameters of one particular exemplary embodiment (TABLE 1), along with the determined effect that each parameter had on stopping distance relative to nominal stopping distance;

DETAILED DESCRIPTION OF THE EXEMPLARY EMBODIMENTS

Figure 1:
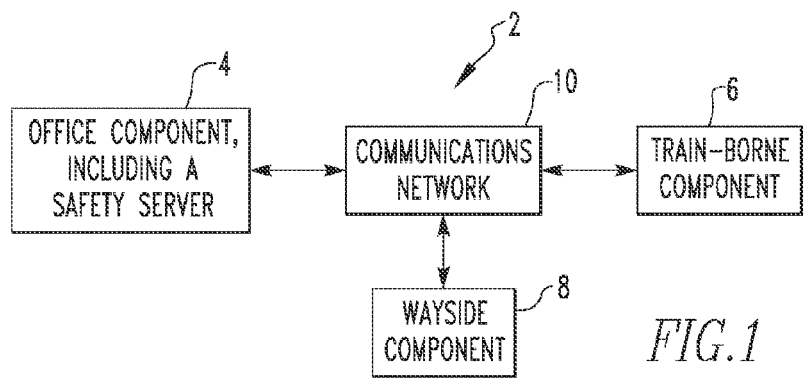
FIG. 1 is a block diagram of a high-level architecture of a railroad Positive Train Control (PTC) system according to one particular embodiment which implements the principles of the present invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

FIG. 1 is a block diagram of a high-level architecture of a railroad Positive Train Control (PTC) system 2 according to one particular embodiment which implements the principles of the present invention as described in greater detail herein. As seen in FIG. 1, the PTC system 2 includes an office component 4, including a safety server, a train-borne component 6, and a wayside component 8. The three components of the PTC System 2 just described exchange information with each other using a secure communications network 10, which is typically a wireless data radio network. The office component 4 of the PTC system 2 provides a central command and control facility for management of the train traffic and work crews on the railroad. As noted above, the office component 4 also contains a safety server that adds the required safety level to the command and control functions of the PTC system 2 by knowing where all of the trains are located in the railroad system associated with the PTC system 2. As described in greater detail elsewhere herein, the train-borne component 6 includes an on-board computer 12 (FIG. 2) that performs all train-borne control functions of the PTC system 2, including safe speed control and braking. The train-borne component 6 also includes a number of human-machine interfaces in the form of locomotive display units 14 (FIG. 2) for the train crew to interact with the PTC system 2. The wayside component 8 provides vital information to the office component 4 and the train-borne component 6 regarding the status of wayside devices such as switches, signals, track circuits (used for rail integrity monitoring), highway-rail grade crossing warning devices, and hazard detectors, etc., in order to maintain safe train movement on the railroad.

Figure 2:
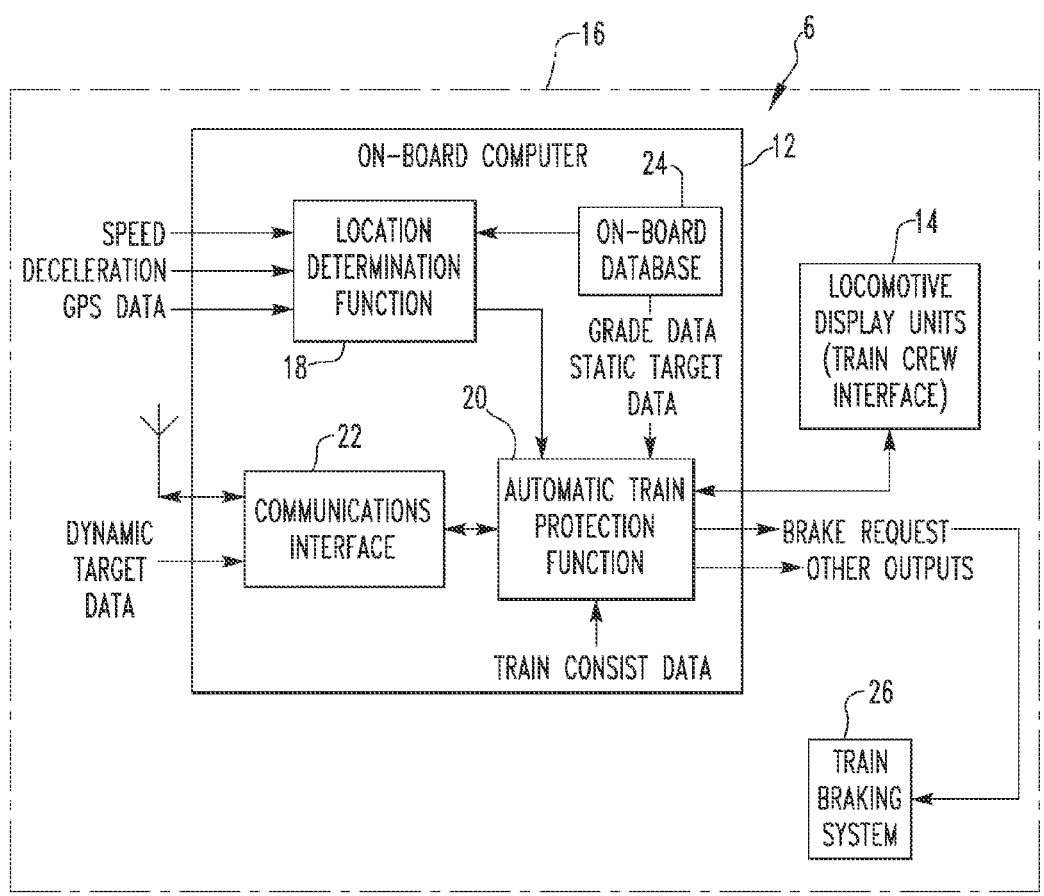
FIG. 2 is a block diagram of certain components of the train-borne component of the PTC system of FIG. 1 according to an exemplary embodiment of the invention.

FIG. 2 is a block diagram of certain components of the train-borne component 6 provided on a train 16 according to an exemplary embodiment of the invention. As noted above, the train-borne component 6 includes an on-board computer 12 that performs all train-borne control functions of the PTC system 2. In the exemplary embodiment, the on-board computer 12 consists of one or more processing units that are programmed to perform all of the functions necessary for safe train control. In particular, the train braking function that is described in detail in the '959 application cited above is implemented in the on-board computer 12. Furthermore, according to an aspect of the present invention, that function is adapted to employ a method (described in detail herein) of adjusting the brake propagation delay time ($T_d$), brake build-up time (T) and maximum brake rate ($\alpha_{max}$) braking parameters so that those braking parameters can account for random variation in the train consist parameters and other factors in order to ensure safe braking performance of the train 16 while also improving it operational efficiency. In connection with such an implementation, as seen in FIG. 2, the on-board computer 12 includes a Location Determination (LD) function 18, an Automatic Train Protection (ATP) function 20, a communications interface 22, and an on-board database 24, each described below.

The communications interface 22 allows for communications with the office component 4 and the wayside component 8. The on-board database 24 is preloaded with and stores certain information needed by the train-borne component 6 including, without limitation, an ATP target table which includes information relating to a number of targets in the railroad system. In the exemplary embodiment, the ATP target table includes the following data for each target: (i) the location of the target (from which a current distance to the target may be determined), (ii) the target speed limit ($V_T$), and (iii) the distance between the target and the previous target.

The ATP target table that is stored in the on-board database 24 may be for the entire railroad system, or for a portion of the railroad system that is relevant to the train 16 for its current journey. Also, the ATP target table that is stored in the on-board database 24 may be updated periodically by the office component 4 through the communications interface 22.

In operation, the locations of the leading end and trailing end of the train 16 are determined by the LD function 18 and the ATP function 20 using inputs such as train speed, GPS coordinates, train deceleration (under slip/slide conditions) and the track segment information stored in the on-board database 24. In the exemplary embodiment, the ATP function 20 continuously receives other safety-critical information from the office component 4 and the wayside component 8 via the communications interface 22, looks a certain distance (e.g., three miles) ahead of the current location of the train 16 for any speed restrictions to be met (based on information from the ATP target table stored in the on-board database 24), and determines the safe speed limit at its current location. It also determines the time to a penalty brake application in the event the train exceeds the safe speed limit. As used herein, the term "time to penalty" shall mean the time (in seconds) that a train can travel at its current speed before a penalty brake request will occur in response to a penalty curve violation, and the term "penalty brake request" shall mean a full service brake request in response to a penalty condition. The ATP function 20 computes these safety-critical outputs using the braking function methodology described in detail in the '959 application. As described elsewhere herein, that braking function methodology employs and is based on three particular braking parameters, namely brake propagation delay time ($T_d$), brake build-up time (T) and maximum brake rate ($\alpha_{max}$), which are be used to determine needed information such as braking profiles and profile velocities. Typically, as described in the '959 application, the braking parameters are computed in the on-board computer 12 for a given type of train consist at the beginning its journey and at any intermediate point when the particulars of the consist change due to car set-outs and pick-ups. In addition, according to the present invention as described in detail below, the braking function methodology is implemented in a manner wherein the required braking parameters are also adjusted to account for random variations in certain train consist parameters and other factors.

The ATP function 20 also conveys certain information, such as distance to target and time to penalty, to the train crew via the locomotive display units 14 forming a part of the train-borne component 6. If the speed of the train 16 exceeds the safe limit at any point, the ATP function 20 issues a penalty brake request to reduce the speed of the train 16 to a safe speed (e.g., a complete stop). More specifically, in the case of a penalty brake request, the ATP function 20 sends a brake request to the train braking system 26 of the train 16 which causes the brakes of the train 16 to be applied. The ATP function 20 simply performs overspeed protection at the current civil speed limit when there are no other speed restrictions within three miles of the current location of the train 16.

Figure 3:
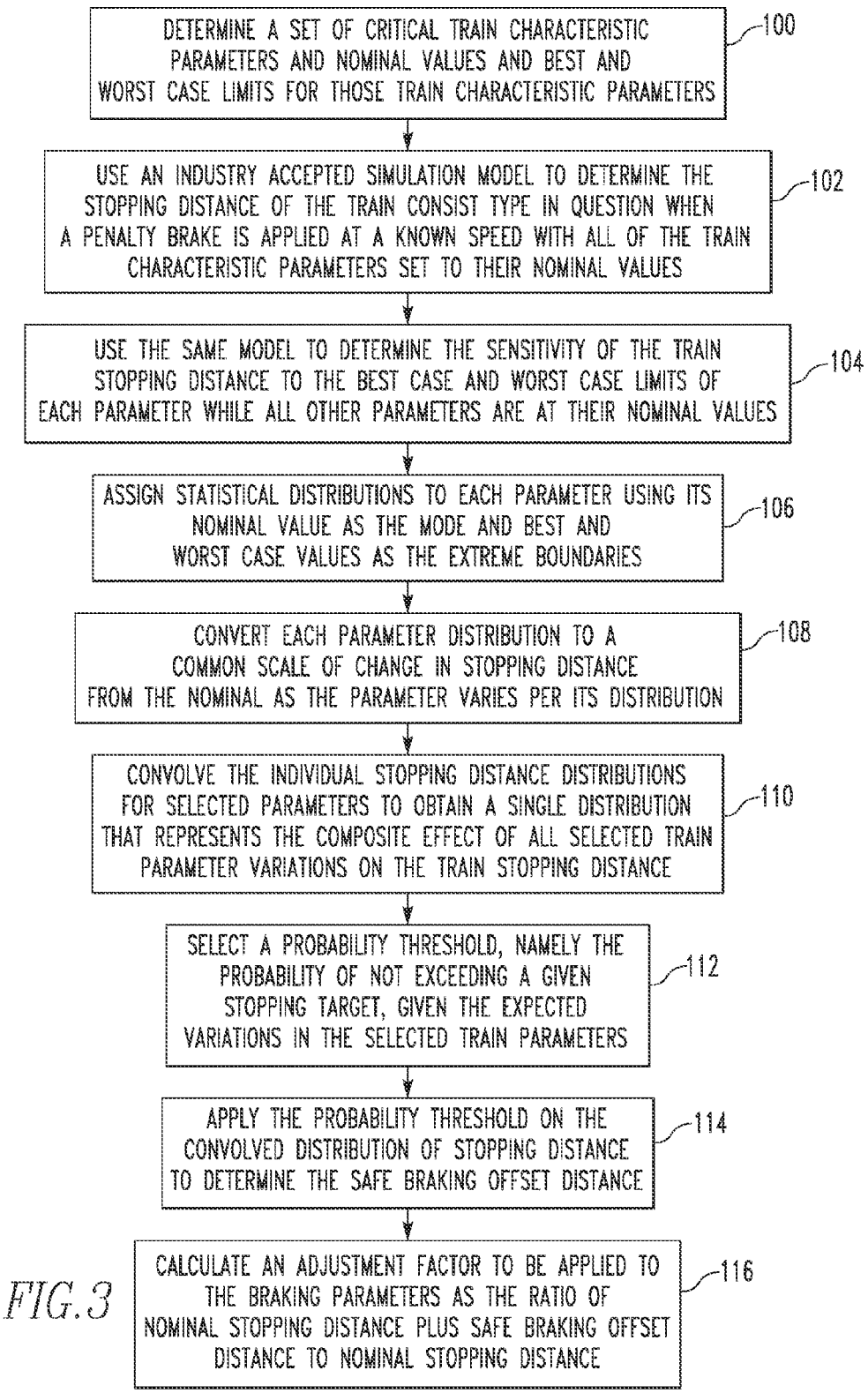
FIG. 3 is a flowchart showing a method of adjusting braking parameters to account for random variation in the train consist parameters and other factors according to an exemplary embodiment of the present invention.

FIG. 3 is a flowchart showing a method of adjusting the brake propagation delay time ($T_d$), brake build-up time (T) and maximum brake rate ($\alpha_{max}$) braking parameters to account for random variation in the train consist parameters and other factors according to an exemplary embodiment of the present invention for any particular train consist type. The method begins at step 100, wherein a set of critical train characteristic parameters is selected and identified, and nominal values and best and worst case limits for those train characteristic parameters are determined. In one particular, non-limiting exemplary embodiment, the present inventors identified a number of critical train characteristic parameters, and for each such critical train characteristic parameter determined a nominal value and limits of variation (best and worst case limits). Those parameters and values are set forth in TABLE 1 provided below. The particular embodiment shown in TABLE 1 is for a typical freight train consist that could contain any mix of different freight cars such as flat cars, tank cars, hoppers, box cars, gondolas, air dumps, etc. Similar determinations can be made for other train types, such as unit steel hopper trains, unit tank car trains, mixed hopper (steel and aluminum) trains, and passenger trains, etc.

TABLE 1

Train Parameters for Mixed Freight Car Train

| Parameter | Best Case Value | Nominal Value | Worst Case Value | Notes and Assumption |
|---|---|---|---|---|
| Locomotive Location and Distributed Power | 2 HE, 2⅔ back, with DP | All 4 HE, No DP | All 4 HE, No DP | Locomotive location is assumed to be known per operating procedure, but worst case value (all 4 HE, no DP) is used. Distributed power is a non-vital function so its benefits should be ignored in the Braking design. |
| Empty Load Sensors | 0% E/L equipped | 7% E/L equipped (Tank: 7% TOFC: 14% All others: 0%) | 100% E/L equipped | Nominal E/L sensor percentages is determined based on mix of population percentages for each individual car type: Tank 50%, TOFC 25%, Covered Hopper 10%, Air Dump 5%, Box Car 5%, Gondola 5%. Also note that empty trains equipped with E/L sensors will take |

TABLE 1-continued

Train Parameters for Mixed Freight Car Train

| Parameter | Best Case Value | Nominal Value | Worst Case Value | Notes and Assumption |
|---|---|---|---|---|
| | | | | longer to stop, so "worst case" is actually MORE E/L sensors. |
| Percent Operable Brakes | 100% | 95% | 85% | Per operating rule, a train leaving a terminal must have 100% operative brakes and at no time en route can the train operate with less than 85% operative brakes. The nominal case is set at 95% conservatively. |
| Load/Empty Count | All empties | +2% loaded | +10% loaded | Concept: affects the train weight by assuming load/empty counts provided to the PTC System are incorrect/stale. Note that this is not modeling an intentional mixed consist, but rather the case where several cars in the consist were inadvertently left loaded. Procedurally the count should be very accurate, but assume a small chance of error resulting in extra unexpectedly loaded cars in an empty consist. |
| Vehicle Brake Force/Brake Shoe (given a 30-psi brake pipe reduction from a 90-psi brake pipe pressure) | 13% Loaded NBR (Tank: 4258 lbf TOFC: 3348 lbf Covered Hopper: 4271 lbf Air Dump: 4259 lbf Box Car: 4280 lbf Gondola: 3205 lbf) | 10% Loaded NBR (Tank: 3275 lbf TOFC: 2575 lbf Covered Hopper: 3285 lbf Air Dump: 3276 lbf Box Car: 3293 lbf Gondola: 2465 lbf) | 8.5% Loaded NBR (Tank: 2784 lbf TOFC: 2189 lbf Covered Hopper: 2792 lbf Air Dump: 2785 lbf Box Car: 2799 lbf Gondola: 2095 lbf) | Based on the range of allowable loaded Net Braking Ratios (NBR) from AAR Standard S-401, "Brake Design Requirements". S-401 allows for loaded NBR in the range of 8.5%-13% with a 30-psi brake pipe reduction from a 90-psi brake pipe pressure. Assume with good maintenance practices that this should fall around nominal value, but with some wider spread possible. |
| Vehicle Brake Cylinder Piston Stroke | 6 inches | 7.5 inches | 9 inches | Range values from AAR data. Assume with good maintenance practices that this should fall around nominal value, but with some wider spread possible. |
| Nominal Brake Pipe Pressure | 90 psi | 88 psi | 80 psi | Assume with good maintenance practices that the nominal pressure should fall around the best case value, but with some wider spread possible. |

TABLE 1-continued

Train Parameters for Mixed Freight Car Train

| Parameter | Best Case Value | Nominal Value | Worst Case Value | Notes and Assumption |
|---|---|---|---|---|
| Vehicle Load | −10% (Tank: 136800 lbs TOFC: 138600 lbs Covered Hopper: 180900 lbs Air Dump: 164700 lbs Box Car: 162000 lbs Gondola: 126000 lbs) | 0% (Tank: 152000 lbs TOFC: 154000 lbs Covered Hopper: 201000 lbs Air Dump: 183000 lbs Box Car: 180000 lbs Gondola: 140000 lbs) | +10% (Tank: 167200 lbs TOFC: 169400 lbs Covered Hopper: 221100 lbs Air dump: 201300 lbs Box Car: 198000 lbs Gondola: 154000 lbs) | Tank: Weight determination is based on loaded volume and weight per gallon of product. Assume expected weight variation can vary from −10% to +10%. Set nominal at mid-point of range (0%). TOFC: Assume expected weight variation can vary from −10% to +10% from that reported to the PTC System (Nominal set at mid-point of 0%) Covered Hoppers, Air Dumps, Box Cars, Gondolas: Assume weight can vary from −10% to +10% from that reported to the PTC System (Nominal set at mid-point of 0%) |
| Vehicle Brake Valve Type | All ABDX | 39% ABDX, 24% ABDW, 37% ABD (Tank: 70% ABDX, 23% ABDW, 7% ABD TOFC: 12% ABDX, 25% ABDW, 63% ABD Covered Hopper: 21% ABDW, 79% ABD Air Dump: 13% ABDX, 87% ABDW Box Car: 100% ABD Gondola: 100% ABD) | All ABD | Nominal brake valve type percentages based on mix of population percentages for each individual type: Tank 50%, TOFC 25%, Covered Hopper 10%, Air Dump 5%, Box Car 5%, Gondola 5%. |
| Ambient Temperature | 100 deg F. | 20 deg F. | −60 deg F. | Average annual low (from National Weather Service) taken over territory is 22.4 deg F., round to 20 deg F. which is also the mid-point of the range. |
| Vehicle Brake Pipe Length | −10% (Tank: 54 feet TOFC: 58 feet Covered Hopper: 52 feet Air Dump: 47 feet Box Car: 67 feet Gondola: 45 feet) | Actual (Tank: 60 feet TOFC: 64 feet Covered Hopper: 58 feet Air Dump: 52 feet Box Car: 74 feet Gondola: 50 feet) | +10% (Tank: 66 feet TOFC: 70 Feet Covered Hopper: 64 feet Air Dump: 57 feet Box Car: 81 feet Gondola: 55 feet) | Variation is expected between actual length and length available to the PTC System, although large variations are not expected. Assume very closely spread around nominal value. |
| % Grade Error | +0.1% grade | As stated grade | −0.1% grade | Concept: Models potential error in grade database stored in on-board computer. Assume very closely spread |

TABLE 1-continued

Train Parameters for Mixed Freight Car Train

| Parameter | Best Case Value | Nominal Value | Worst Case Value | Notes and Assumption |
|---|---|---|---|---|
| Train Speed Error | −0.5 mph | 0 mph | +0.5 mph | around nominal value. Concept: Models potential train speed error in tachometers or on-board speed processing. Assume very closely spread around nominal value. |
| Vehicle Count | −5% cars | Correct Count | +5% cars | Concept: varies train weight/length by adding/subtracting loaded cars to/from the consist, assuming car counts can be off slightly. Procedurally the count should be very accurate, but assume a small chance of error. |
| Locomotive Weight | −5%: SD70MAC: 394250 lbs GP40: 256500 lbs | Actual: SD70MAC: 415000 lbs GP40: 270000 lbs | +5%: SD70MAC: 435750 lbs GP40: 283500 lbs | Variation could be expected based on fuel weight, otherwise minimal. Assume very closely spread around nominal value. |
| Vehicle Length | −5% (Tank: 52 feet TOFC: 54 feet Covered Hopper: 51 feet Air Dump: 45 feet Box Car: 66 feet Gondola: 43 feet) | Actual (Tank: 55 feet TOFC: 57 feet Covered Hopper: 54 feet Air Dump: 47 feet Box Car: 69 feet Gondola: 45 feet) | +5% (Tank: 58 feet TOFC: 60 feet Covered Hopper: 57 feet Air Dump: 49 feet Box Car: 72 feet Gondola: 47 feet) | Some variation is expected between actual length and length available to the PTC system, although large errors are not expected. Assume very closely spread around nominal value. |
| Ambient Pressure | 14.0 psi | 14.7 psi | 14.7 psi | Assume very closely spread around nominal value. |
| Brake Pipe Leakage | 5 psig/min | 0.1 psig/min | 0.1 psig/min | Leakage affects two items: propagation of brake signal early in the brake application and equalization pressure which can have conflicting effects on stopping distance. Therefore the effect of leakage varies by consist but typically, more leakage = faster braking so highest leakage corresponds to best case value. Assume very closely spread around nominal value with good maintenance practices. |

OTHER POTENTIAL PARAMETERS: Vehicle Aerodynamic Resistance, Vehicle Brake Rigging Type, Vehicle Orientation, Control Relay Latency Next, at step 102, an industry accepted simulation model is used to determine the stopping distance of the train consist type (e.g., a Mixed Freight Car Train) in question when a penalty brake is applied at a known speed with all of the train characteristic parameters of step 100 set to their nominal values. In the particular, non-limiting exemplary embodiment described above, the simulation model that was used was the well known Train Operation and Energy Simulator (TOES™) developed by Transportation Technology Center, Inc. (TTCI). As is known, TOES™ is a state of the art train action model developed for and licensed to AAR-member railroads that models the interaction of train air-brake and ECP-brake systems, inter-car coupling behavior, locomotive performance characteristics, and train resistance forces. Then, at step 104, the same model (TOES™ in the particular, non-limiting exemplary embodiment) is used to determine the sensitivity of the train stopping distance to the best case and worst case limits of each train characteristic parameter while all other train characteristic parameters are at their nominal values. In other words, using the model, the stopping distance of the train when each parameter is at its positive and negative (or upper and lower) limit, while all other parameters remain at their nominal values, is determined. In this sensitivity analysis, the parameter limit that results in a decrease in the stopping distance relative to the nominal stopping distance is called the best case value of the parameter, and the parameter limit that results in an increase in the stopping distance relative to the nominal stopping distance is called the worst case value of the parameter. FIGS. 4A-4G provide a table that shows the nominal, best case and worst case values for certain of the train characteristic parameters of the particular exemplary embodiment (TABLE 1), along with the determined effect that each parameter had on stopping distance relative to nominal stopping distance in the sensitivity analysis just described.

In order to determine the combined effect of random variations in the train characteristic parameters, probability density functions must be assigned to each of the parameters. Thus, at step 106, statistical distributions (probability density functions) are assigned to each parameter using its nominal value as the mode and the best and worst case values as the extreme boundaries. In the exemplary embodiment, the beta distribution is chosen for this purpose. The probability density function of the beta distribution is as follows:

$$f(x; \alpha, \beta) = \frac{x^{\alpha-1}(1-x)^{\beta-1}}{\int_0^1 u^{\alpha-1}(1-u)^{\beta-1} du}$$

$$= \frac{\Gamma(\alpha+\beta)}{\Gamma(\alpha)\Gamma(\beta)} x^{\alpha-1}(1-x)^{\beta-1}$$

$$= \frac{1}{B(\alpha, \beta)} x^{\alpha-1}(1-x)^{\beta-1}$$

In the above probability density function, $\alpha$ and $\beta$ are called the shape parameters and $\Gamma$ is the gamma function. The beta function, B, appears as a normalization constant to ensure that the total probability integrates to unity. In the exemplary, non-limiting embodiment, the beta distribution is chosen since it can be easily tuned to a desired shape and can also generate truncated Gaussian and Uniform distributions via the shaping parameters: Beta distribution, skewed to the left, ($\alpha<\beta$); Beta distribution, skewed to the right, ($\alpha>\beta$); Beta distribution, wide Gaussian ($\alpha=\beta$).

Figure 4A:
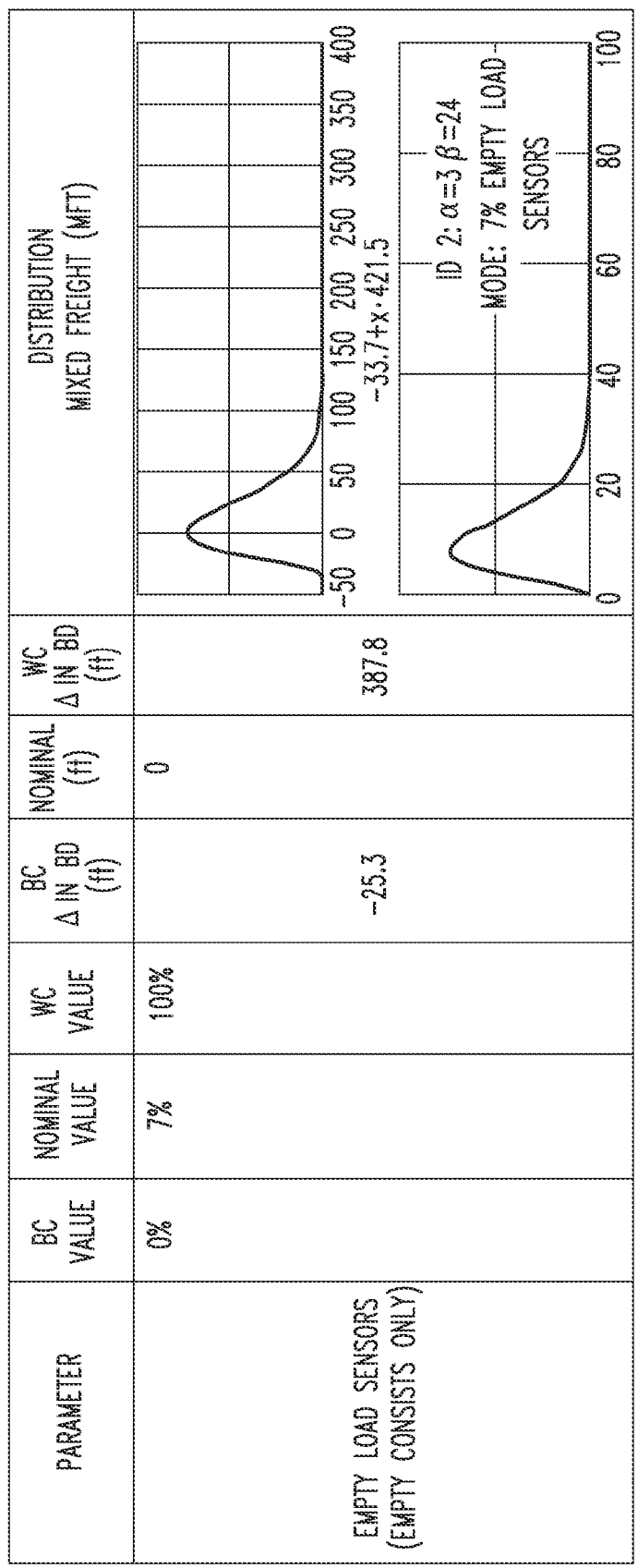
Figure 4B:
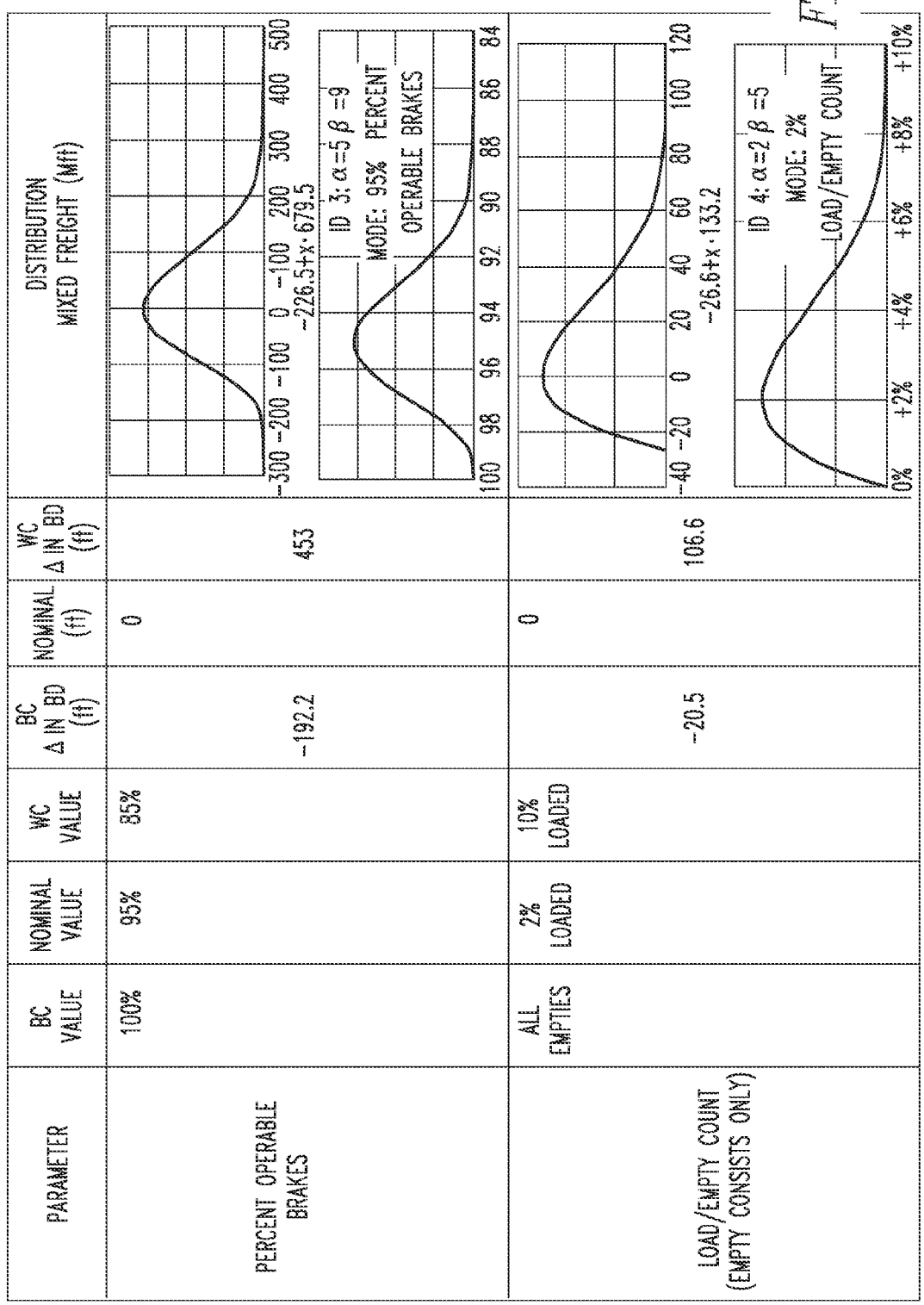
Figure 4D:
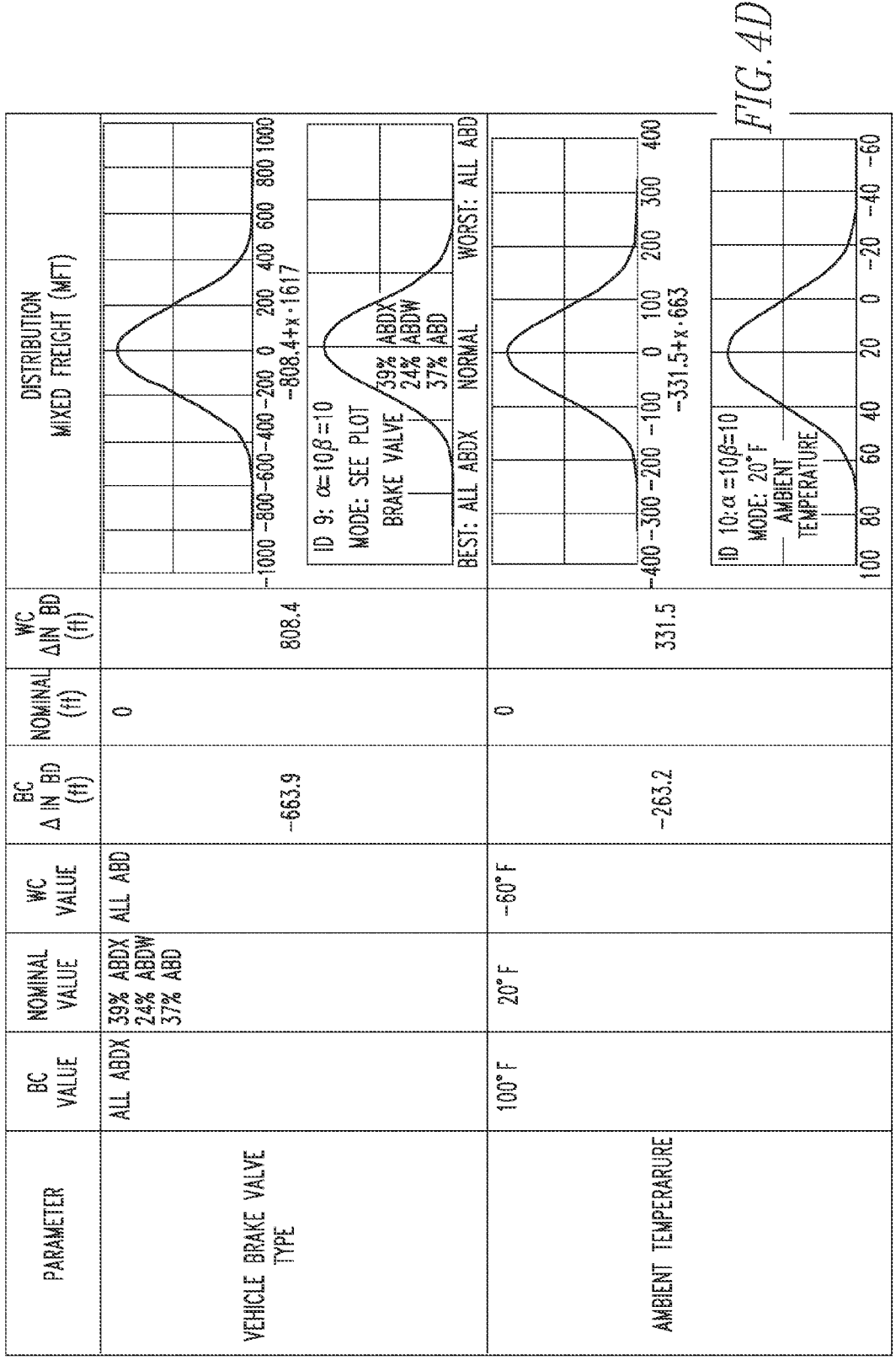
Figure 4E:
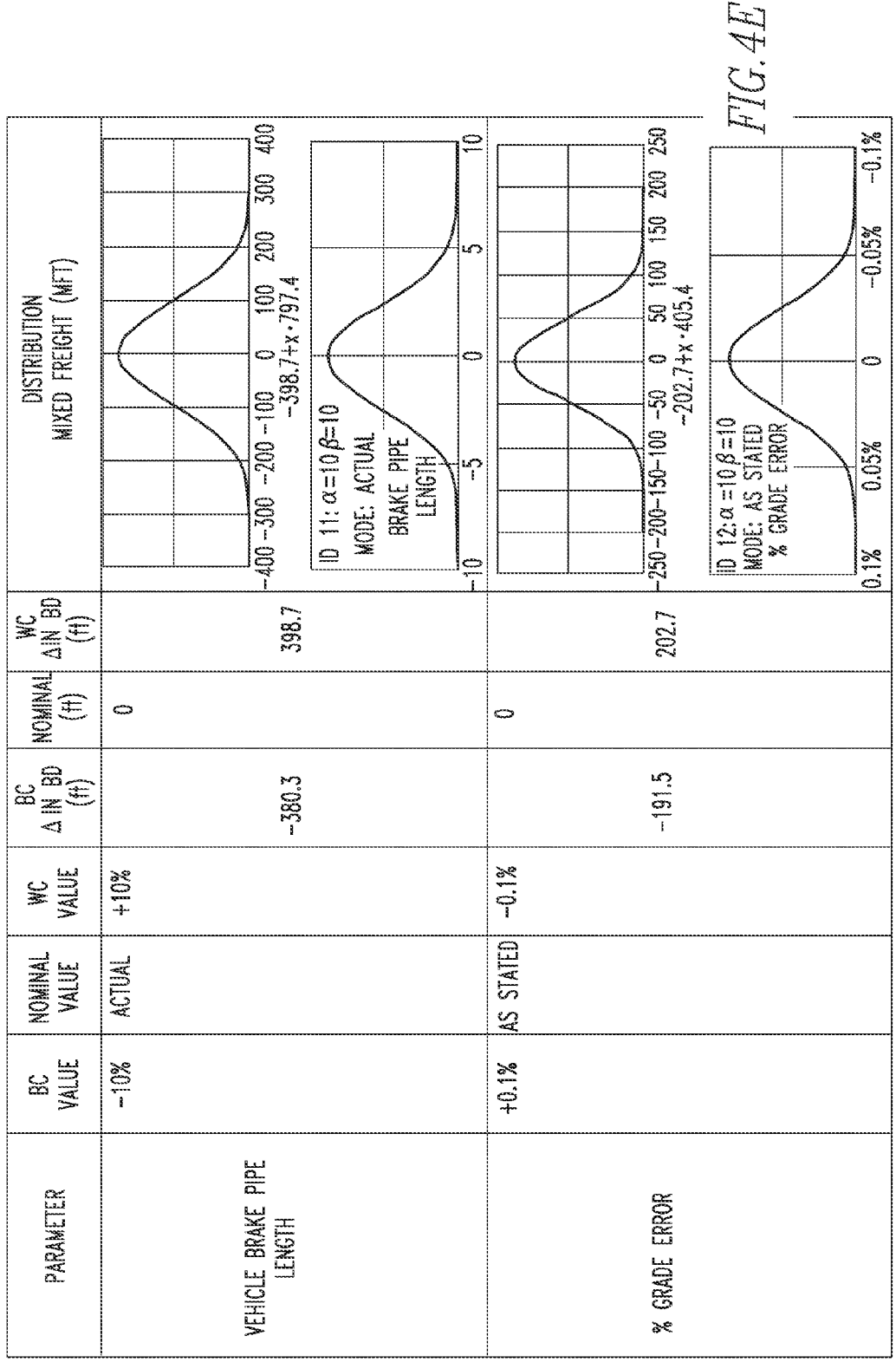
Figure 4F:
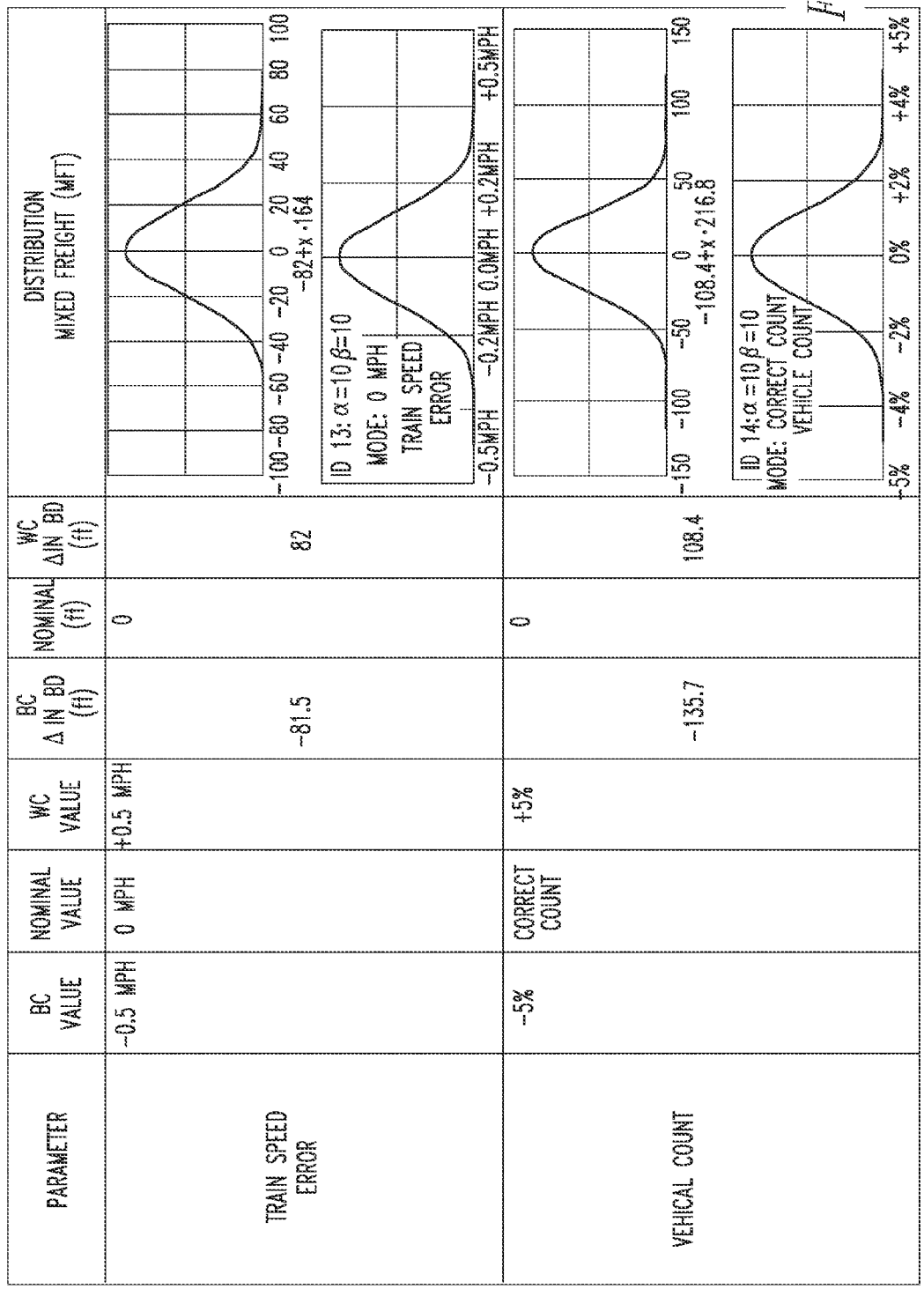
Figure 5:
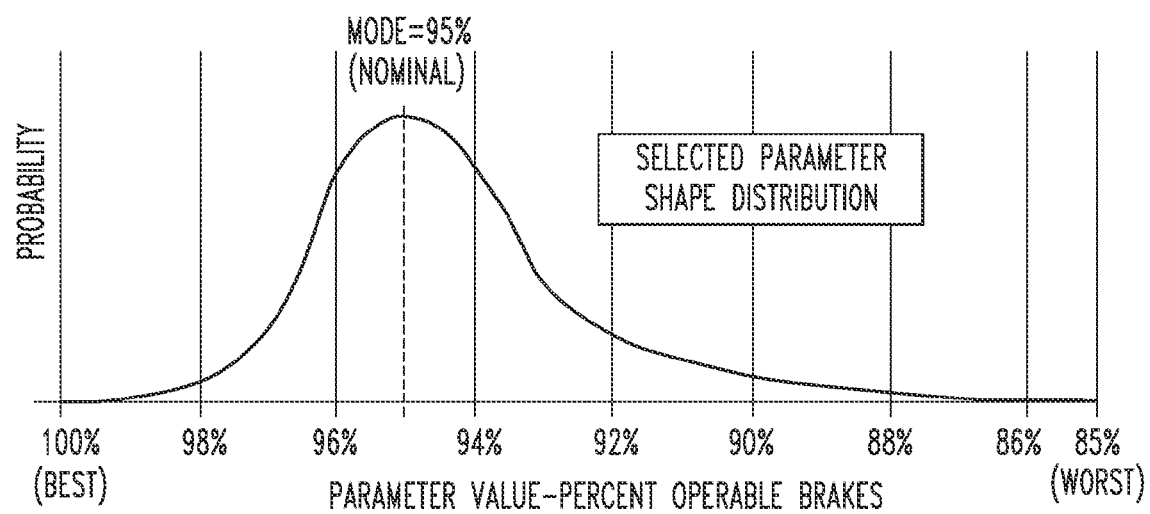
FIG. 5 shows the beta distribution for one train characteristic parameter, percent operable brakes, for one example implementation used herein for illustrative purposes.

FIG. 5 shows the beta distribution for one of the train characteristic parameters, percent operable brakes, for one example implementation used herein for illustrative purposes. Note that the mode of this distribution represents the point at which there is an equal 50% probability of the value being higher or lower than the mode value, with the distribution being constrained to lie in between the endpoints. In the present example, the mode is selected as 95% (the nominal value), with the distribution being constrained between 100% (best case) and 85% (worst case). FIGS. 4A-4G show the beta distribution for certain of the train characteristic parameters in the particular exemplary embodiment described herein for Mixed Freight Car Train.

Figure 6:
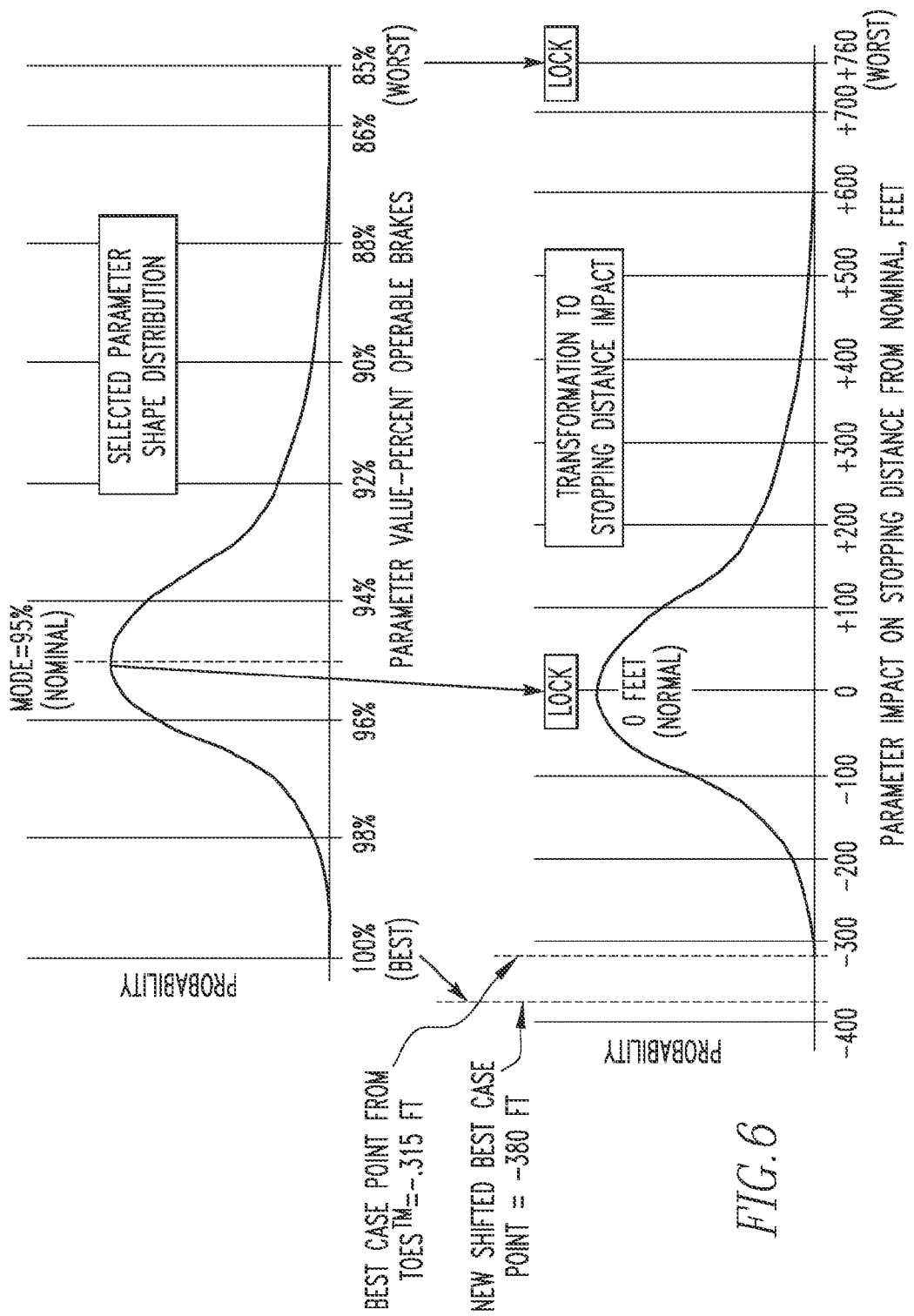
FIG. 6 shows the beta distribution of FIG. 5 to a common scale of change in stopping distance form nominal.

Next, at step 108, each parameter distribution is converted to a common scale of change in stopping distance from nominal as the parameter in question varies per its distribution (from step 106). For example, the best case side of the distribution would result in shorter stopping distances and the worst case side of the distribution would result in longer stopping distances, all measured as change from nominal. This conversion is done using the simulation model (TOES™ in the particular, non-limiting exemplary embodiment) stopping distances for the best case, nominal and worst case conditions for each parameter. Note that in cases where it is not possible to match all three data points, the worst case and nominal values are matched (while preserving the distribution shape) since they are the most critical of the three points. The best case value endpoint always results in shorter stopping distances, so using the other two points to fit the distribution is a conservative approach. This process is illustrated in FIG. 6 for the percent operable brakes train characteristic parameter for one example implementation used herein for illustrative purposes. As can be seen, locking on the nominal and worst case data points (from TOES™ in the example) effectively results in a slight shift of the best case point of the distribution to the left slightly past the best case data point (from TOES™ in the example). Note that for some parameters, the process may instead result in a slight compression of the best case data point. Since the worst case end point is ultimately used to derive the adjustment factor, this slight adjustment to the best case point does not significantly impact the final convolution results (described below). FIGS. 4A-4G show the above described conversion for certain of the train characteristic parameters in the particular exemplary embodiment described herein for Mixed Freight Car Train (with the result being a distribution of change in stopping distance from nominal as the parameter varies).

The next step, which is step 110 in FIG. 3B, is to perform a convolution on the probability density functions of selected significant train characteristic parameters from FIGS. 4A-4G to obtain a single distribution of stopping distances. The convolution process is the determination of the joint probability distribution function that defines the joint behavior of two or more random variables, using their individual probability density functions (the stopping distance functions from step 108). Due to the large number of train characteristic parameters to be considered in the exemplary embodiment, a stepwise integration method is used. Thus method involves calculating the combination of all products of the selected train characteristic parameter probabilities that result in a specific change (e.g., 25 ft.) in the stopping distance. This specific change in the stopping distance from its nominal value is plotted against the sum of all product possibilities over the range of the best case and worst case limits of stopping distance.

Next, at step 112, a probability threshold to be applied to the convolved distribution is selected. In particular, the selected probability threshold reflects the probability of not exceeding a given stopping target, given the expected variations of the selected train parameters. For example, a threshold of P=0.99999 (99.999%) can be used. Then, at step 114, the probability threshold is applied to the convolved distribution of stopping distance to determine the safe braking offset distance, which is the stopping distance variation from the convolved distribution at the probability threshold point. As described below, this safe braking offset distance is in the exemplary embodiment used to adjust the three braking parameters, namely brake propagation delay time ($T_d$), brake build-up time (T) and maximum brake rate ($\alpha_{max}$).

Finally, at step 116, an adjustment factor to be applied to the braking parameters is calculated based on the safe braking offset distance. In the exemplary embodiment, the adjustment factor is calculated as the ratio of nominal stopping distance plus safe braking offset distance to nominal stopping distance. That adjustment factor is then applied to each braking parameter to obtain adjusted braking parameters (i.e., adjusted brake propagation delay time ($T_d$), adjusted brake build-up time (T) and maximum brake rate ($\alpha_{max}$)). Each adjusted braking parameter is then used in the braking function (described elsewhere herein) that is implemented in the on-board computer 12 to control braking of the train 16.

Note that, although the stopping distances and the adjustment factor are all derived at a specific initial speed for a given train type, the same adjustment factor applies at any speed since the braking parameter expressions are independent of the train speed. Also note that, in the exemplary embodiment, where all-empty or all-loaded train consists are run, as in the case of unit hopper or unit tank car trains, the adjustment factor is calculated for both consists and the higher one is used to adjust the braking parameter values $T_d$, T and $\alpha_{max}$ as a conservative approach.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of adjusting one or more of braking parameters used in a braking function to control braking of a train, comprising:
   determining an adjustment factor based on a joint stopping distance probability distribution, the joint stopping distance probability distribution representing the composite effect on stopping distance of a plurality of predetermined train characteristic parameters, each of the predetermined train characteristic parameters being variable, wherein the determining the adjustment factor comprises applying a probability threshold to the joint stopping distance probability distribution to determine a safe braking offset distance, and calculating the adjustment factor based on the safe braking offset distance; and
   applying the adjustment factor to each of the one or more of braking parameters.

2. The method according to claim 1, wherein the one or more of braking parameters comprise brake propagation delay time ($T_d$), brake build-up time (T) and maximum brake rate ($\alpha_{max}$).

3. The method according to claim 1 wherein the calculating the adjustment factor comprises calculating the adjustment factor as a ratio of a nominal stopping distance plus the safe braking offset distance to the nominal stopping distance.

4. The method according to claim 3, wherein each of the plurality of predetermined train characteristic parameters has a predetermined nominal value, and wherein the nominal stopping distance is a stopping distance determined based on each of the plurality of predetermined train characteristic parameters being set to its predetermined nominal value.

5. The method according to claim 1, wherein each of the plurality of predetermined train characteristic parameters has a nominal value, a worst case limit value and a best case limit value, the method further comprising determining the joint stopping distance probability distribution by:
   assigning a probability density function to each of the predetermined train characteristic parameters using its nominal value as the mode and the best case limit value and the worst case limit value as the extreme boundaries;
   converting each probability density function to a corresponding stopping distance probability distribution representing change in stopping distance front nominal as the associated train characteristic parameter varies per its probability density function; and
   convolving the corresponding stopping distance probability distributions to generate the joint stopping distance probability distribution.

6. The method according to claim 5, further comprising determining a nominal stopping distance based on each of the plurality of predetermined train characteristic parameters being set to its nominal value, wherein for each of the predetermined train characteristic parameters, the best case limit value will result in a stopping distance decrease from the nominal stopping distance and the worst case limit value will result in a stopping distance increase from the nominal stopping distance.

7. The method according to claim 6, further comprising selecting a set of train characteristic parameters, the plurality of predetermined train characteristic parameters being a subset of the set of train characteristic parameters, and selecting the plurality of predetermined train characteristic parameters based on a determination that each of the plurality of predetermined train characteristic parameters has at least a predetermined effect on stopping distance.

8. A train-borne component of a positive train control system comprising an on-board computer for a train, the on-board computer being programmed to control braking of the train using one or more of braking parameters by:
   applying an adjustment factor to each of the one or more of braking parameters to obtain one or more adjusted braking parameters, the adjustment factor being based on a joint stopping distance probability distribution, the joint stopping distance probability distribution representing the composite effect on stopping distance of a plurality of predetermined train characteristic parameters, each of the predetermined train characteristic parameters being variable, wherein the adjustment factor is determined by applying a probability threshold to the joint stopping distance probability distribution to determine a safe braking offset distance, and calculating the adjustment factor based on the safe braking offset distance; and
   controlling braking of the train in the on-board computer using the one or more adjusted braking parameters.

9. The train-borne component according to claim 8, wherein the one or more of braking parameters comprise brake propagation delay time ($T_d$), brake build-up time (T) and maximum brake rate ($\alpha_{max}$).

10. The train-borne component according to claim 8, wherein the adjustment factor is a ratio of a nominal stopping distance plus the safe braking offset distance to the nominal stopping distance.

11. The train-borne component according to claim 10, wherein each of the plurality of predetermined train characteristic parameters has a predetermined nominal value, and wherein the nominal stopping distance is a stopping distance determined based on each of the plurality of predetermined train characteristic parameters being set to its predetermined nominal value.

12. The train-borne component according to claim 8, wherein each of the plurality of predetermined train characteristic parameters has a nominal value, a worst case limit value and a best case limit value, and wherein the joint stopping distance probability distribution is determined using the nominal value, the worst case limit value and the best case limit value of each of the predetermined train characteristic parameters.

13. A method adjusting one or more of braking parameters used in a braking function to control braking of a train, comprising:
determining an adjustment factor based on a nominal value, a worst case limit value and a best case limit value of each of a plurality of predetermined train characteristic parameters, each of the predetermined train characteristic parameters being variable, wherein the determining the adjustment factor comprises determining a joint stopping distance probability distribution using the nominal value, the worst case limit value and the best case limit value of each the predetermined train characteristic parameters, the joint stopping distance probability distribution representing the composite effect on stopping distance of the predetermined train characteristic parameters, and wherein the determining the adjustment factor comprises applying a probability threshold to the joint stopping distance probability distribution to determine a safe braking offset distance, and calculating the adjustment factor based on the safe braking offset distance; and
applying the adjustment factor to each of the one or more of braking parameters.

14. The method according to claim 13, wherein the one or more of braking parameters comprise brake propagation delay time ($T_d$), brake build-up time (T) and maximum brake rate ($\alpha_{max}$).

15. The method according to claim 13, wherein the calculating the adjustment factor comprises calculating the adjustment factor as a ratio of a nominal stopping distance plus the safe braking offset distance to the nominal stopping distance.

16. A train-borne component of a positive train control system comprising an on-board computer for a train, the on-board computer being programmed to control braking of the train using one or more of braking parameters by:
applying an adjustment factor to each of the one or more of braking parameters to obtain one or more adjusted braking parameters, the adjustment factor being based on a nominal value, a worst case limit value and a best case limit value of each of a plurality of predetermined train characteristic parameters, each of the predetermined train characteristic parameters being variable, wherein the adjustment factor is based on a joint stopping distance probability distribution that is determined using the nominal value, the worst case limit value and the best case limit value of each the predetermined train characteristic parameters, the joint stopping distance probability distribution representing the composite effect on stopping distance of the predetermined train characteristic parameters, wherein the adjustment factor is determined by applying a probability threshold to the joint stopping distance probability distribution to determine a safe braking offset distance, and calculating the adjustment factor based on the safe braking offset distance; and
controlling braking of the train in the on-board computer using the one or more adjusted braking parameters.

17. The train-borne component according to claim 16, wherein the adjustment is calculated as a ratio of a nominal stopping distance plus the safe braking offset distance to the nominal stopping distance.

18. The train-borne component according to claim 16, wherein the one or more of braking parameters comprise brake propagation delay time ($T_d$), brake build-up time (T) and maximum brake rate ($\alpha_{max}$).

* * * * *

UNITED STATES PATENT AND TRADEMARK OFFICE
CERTIFICATE OF CORRECTION

PATENT NO. : 9,108,608 B2  Page 1 of 1
APPLICATION NO. : 13/237060
DATED : August 18, 2015
INVENTOR(S) : Eric Dale Cutright et al.

It is certified that error appears in the above-identified patent and that said Letters Patent is hereby corrected as shown below:

In the drawings
Figure 4B, line 7, "-100" should read --100--.

In the specification
Column 1, line 62, "(Td)" should read --($T_d$)--.
Column 1, line 63, "(Td)" should read --($T_d$)--.
Column 2, line 50, "it" should read --its--.
Column 3, line 50, "form" should read --from--.
Column 4, line 51, "it" should read --its--.
Column 14, line 48, "Thus" should read --This--.

In the claims
Column 16, line 11, "front" should read --from--.

Signed and Sealed this
Twenty-second Day of March, 2016

Michelle K. Lee
*Director of the United States Patent and Trademark Office*